United States Patent [19]

Kim

[11] Patent Number: 4,972,283
[45] Date of Patent: Nov. 20, 1990

[54] ROTARY HEAD DRUM FOR A VCR

[75] Inventor: Soo K. Kim, Seoul, Rep. of Korea

[73] Assignee: Goldstar Co., Ltd., Seoul, Rep. of Korea

[21] Appl. No.: 238,859

[22] Filed: Aug. 31, 1988

[30] Foreign Application Priority Data

Aug. 31, 1987 [KR] Rep. of Korea ............ 9609/1987[U]

[51] Int. Cl.$^5$ .............................................. G11B 5/52
[52] U.S. Cl. ................................. 360/107; 360/130.24
[58] Field of Search ............... 360/107, 130.24, 84–85, 360/108

[56] References Cited

U.S. PATENT DOCUMENTS 4,742,414 5/1988 Sakai .............................. 360/130.24

Primary Examiner—A. J. Heinz
Attorney, Agent, or Firm—Birch, Steawrt, Kolasch & Birch

[57] ABSTRACT

A rotary head drum for a VCR using a fluid dynamic pressure bearing comprising a lower drum fixed to a base plate, a rotary shaft attached to the center of the lower drum, an upper drum fixed to a flange, a rotary head fixed to the upper drum to record and reproduce video signal in and from a magnetic tape, and a shaft housing including a guide groove, an air flowing groove having an air hole, a lubricant containing groove having a lubricant flowing hole, and a guide boss. The rotary shaft includes plurality lubricating grooves and a lubricant guide groove, so that the generation of the vibration and noise of conventional ball bearing when rotating the head drum, as a result it is possible to improve the Jitter and Wow-flutter of the video signal which effect upon the quality of the screen in recording or reproducing the video signal.

1 Claim, 3 Drawing Sheets

FIG, 1
PRIOR ART
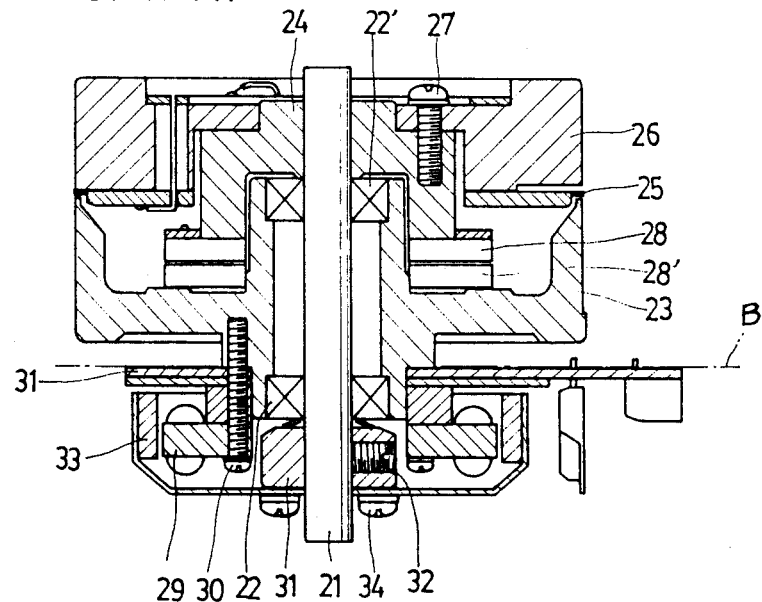
FIG, 2
PRIOR ART
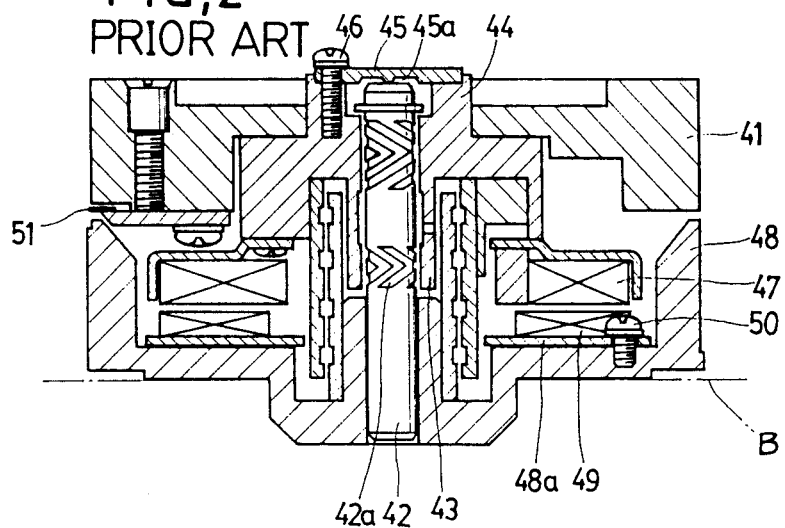

ROTARY HEAD DRUM FOR A VCR

BACKGROUND OF THE INVENTION

The present invention relates to a rotary head drum for a video cassette recorder (hereinafter "VCR"), more particularly to a rotary head drum using a fluid dynamic pressure bearing which improves the screen and voice quality in recording or reproducing a video signal.

In a conventional rotary head drum apparatus as shown in FIG. 1, there are two ball bearings 22, 22' which rotatably support the rotary shaft 21 driven by a motor, and are fixed to the lower drum 23 secured to the base plate B, and a flange 24 inserted in the upper portion of the shaft 21, and an upper drum 26 which is fixed to the flange 24 by a screw 27, and includes a rotary head 25, and two rotary transducers 28, 28' fixed on the upper surface of the lower drum 23, and under the lower surface of said flange 24 respectively, and a stator 29 being secured to the lower end portion of the lower drum by a screw 30, and a ring collar 31 which is fixed to the lower end portion of the shaft 21 by a screw 32, and to which a rotor 33 is fixed by a screw 34.

In the above mentioned conventional rotary head drum apparatus using the ball bearings, according to the rotating of the shaft 21 driven by the rotor 33, flange 24, upper drum 26, rotary transducer 28, and the rotary head 25 which are all fixed to the shaft 21 are rotated. Thus, the rotary head 25 can record or reproduce the video signal in or from a magnetic tape (not shown).

Because the rotating shaft 21 is fixed to the inner wheel of said ball bearings 22, 22' of which outer wheel is fixed to the upper and lower sides of the lower drum 23, the rotation of the shaft 21 rotates the balls and inner wheel of said ball bearings 22, 22', therefore, it is possible to support the rodial and axial loads of the upper drum 26, flange 24, ring collar 31, and the rotor 33 by the ball bearings 22, 22'.

However, in such a conventional head drum apparatus, even though the ball bearings 22, 22' are machined with mechanical accuracy, the rotating vibration and noise are generated from the ball bearings 22, 22', and such a rotating vibration has a bad effect upon the quility of the screen in recording or reproducing the video signal. Furthermore, the magnitude of the vibration more increases according to the dimensional grade and inserting error of the ball bearings 22, 22', and the actual life of the ball bearings 22, 22' is decreased by the wear of the inner and outer wheels and balls, resulting in deereasing the whole life of the VCR.

Additionally, a rotary head drum apparatus using fluid dynamic pressure bearing is well known, and one example of such a head drum apparatus is explained according to FIG. 2.

In the drawing, reference numeral 41 represents an upper drum, and 42 is a fixed shaft having plurality of lubricating grooves 42a, and it is well shown that a flange 44 having a flange boss 43 is rotatably attached to said fixed shaft 42, and said upper drum 41 is fixed to the flange 44 by a screw 46, and to which also a circular plate 45 having a spiral groove 45a, and a rotor 47 is fixed on the lower surface of the flange 44, and the lower portion of the shaft 42 is inserted into a lower drum 48 secured to a main base plate B, and a stator 49 is also fixed on the concave portion 48a of the lower drum 48. In the drawing, the reference numeral 51 is a rotary head fixed to the lower surface of the upper drum 41.

In such a rotary head drum using an aforementioned fluid dynamic pressure bearing, the upper drum 41 and the rotary head 51 are rotated according to the rotation of the rotor 47, thus, the rotary head 51 can record or reproduce a video signal in or from the magnetic tape. In such an actuation, the lower drum 48 fixed to the base plate B and a shaft 42 inserted into the lower drum 48 are not moved because then are all fixed.

According to the rotation of the rotor 47, the lubricant sealed between the flange boss 43 and the shaft 42 flows along the lubricating groove 42a of the shaft 42, and as a result, the fluid dynamic pressure is generated, and supports the radial load of the rotating bodies, and it flows into the spiral groove 45a of the circular plate 45 when the circular plate 45 fixed to the upper portion of the flange 44 is rotated, therefore, it is generated the fluid dynamic pressure to bias the rotating bodies upwardly. When the fluid dynamic pressure is higher than the pressure resulting from the axial load including the weight of the rotating bodies and the suctional power from the magnet of the rotor 47, so that the rotating bodies rise upwardly a few microns.

However, it is also a problem that because the constitution of the aforementioned head drum apparatus applying a fluid dynamic pressure is that the axial load of the rotating bodies and the suctional power of the rotor acts downwardly against the rising power of the fluid dynamic pressure, the rotating of the rotating bodies are not made sufficiently resulting from the offsetting of the rising power against the downwardly acting power each other. That is, the conventional constitution of the head drum has some problems to be resolved which the necessary rising power can not be attained because the downwardly acting power of the bodies counter acts with the upwardly acting power of the fluid dynamic pressure. Furthermore, the lubricant can be smoothly flown along the spiral groove 45a only when the clearance between the spiral groove 45a and the upper portion of the shaft 40 is maintained accurately, but the flowing of the lubricaut is not smoothly flown because the clearance is not maintained accurately according to the dimensional defect and machining error of the circular plate 45 and the right angled deviation of the shaft 42 to have bad effect upon the quility of the rotation, so that the machining of the clearance is to be very precise. Furthermore, the basic constitution shown in FIG. 2 is different from that shown in FIG. 1, so that the common use of the two types head drum apparatuses is not attained. Thus, to apply the latter head drum apparatus, it is necessary to change the whole manufacturing and assembling lines resulting in increasing the cost. Because the rotor 47 and the stator 49 of the latter head drum apparatus are installed between upper and lower drums 41, 48, it is not easy to change or repair the motor.

SUMMARY OF THE INVENTION

Accordingly, the object of the present invention is to provide an improved rotary head drum apparatus for a VCR to resolve the aforementioned problems and defects encountered in the conventional apparatus.

It is further object of the present invention to provide an improved rotary head drum apparatus in which because the weight of the rotating bodies fixed to the rotatable shaft and being rotated along with the shaft acts downwardly while the fluid dynamic pressure generated by the lubricant and the suctional power generated by the magnet of the rotor act upwardly, the rising power is increased to make the operation more smoothly, and it is not needed to pay a precise attention to make the clearance between the housing and the shaft so that it is easy to manufacture or repair the apparatus.

According to the present invention, it provides an improved rotary head drum apparatus in which it is applied a conventional constitution that is comprised of a lower drum fixed to the base plate, a shaft rotatably fixed to the central portion of said lower drum an upper drum fixed to the upper portion of the shaft, and a motor which is comprised of a stator fixed to the lower portion of the lower drum and a rotor fixed to the lower portion of the shaft, further comprising an air flowing groove formed in the bearing housing of the inside of lower drum attaching the rotary shaft, a fluid lubricating groove formed in the upper and lower portions of the shaft, a lubricant containing groove formed in the lower portion of the bearing housing, a fluid guiding groove in the lower portion of the shaft, a spiral groove on the upper surface of the ring collar positioned underside the lubricant containing groove so that the fluid dynamic pressure is easily generated from the forced circulation of the fluid while the rotation of the rotary bodies is generated smoothy because of the forced heat exchanging of the fluid, and the common use of the drum or parts is easily attained.

The above, and other objects, features and advantages of the present invention will become apparent from the following description read in conjunction with the accompanying drawings.

BRIEF DESCRIPTION OF THE DRAWINGS

FIG. 1 is an elevated sectional view of a rotary head drum apparatus using a ball bearing according to ane embodiment of the prior art, FIG. 2 is an elevated sectional view of a rotary head drum apparatus using a fluid dynamic pressure bearing according to another embodiment of the prior art.

DETAILED DESCRIPTION OF THE INVENTION

Figure 3:
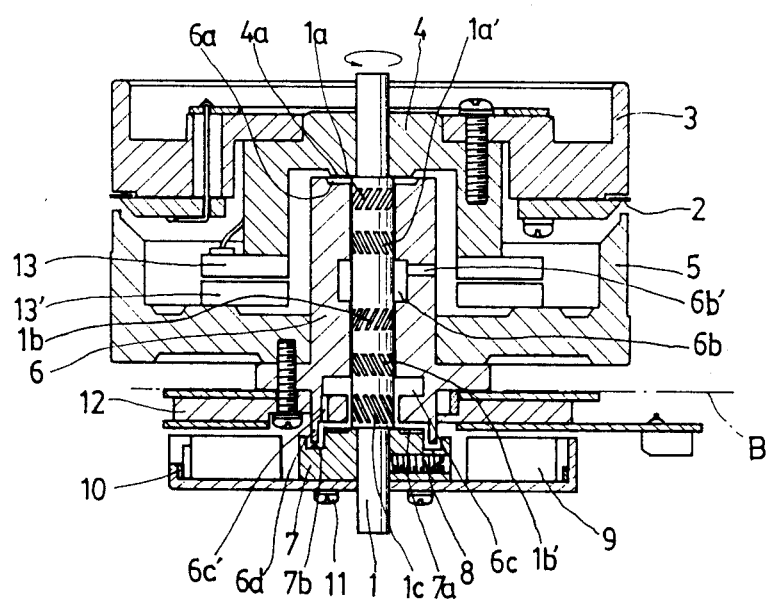
FIG. 3 is an elevated sectional view of a rotary head drum apparatus using a fluid dynamic pressure bearing according to the present invention.

Referring to FIG. 3, the reference numeral 1 is a rotary shaft, 2 is a rotary head, 3 is an upper drum, and there is shown a flange 4 being fixed to said rotary shaft 1. The rotary shaft 1 is rotatably inserted into a housing 6 secured of the inside of a lower drum 5 fixed to a base plate B, and at the lower portion of the rotary shaft 1, a ring collar 7 is fixed by a set serew 8.

At the upper, middle, and lower portions of the outer peripheral surface of the shaft 1, a plurality of lubricating grooves 1a, 1a', 1b, and 1b' and a fluid guiding groove 1c having a desirable inclination are formed, respectively, and at the upper portion of the housing 6, a guide groove 6a corresponding to the guide boss 4a in the lower surface of the flange 4 is formed, and at the middle portion of the housing 6, an air flowing groove 6b having a hole 6b' is formed, and at the lower portion of the housing 6, a lubricant containing groove 6c having plurality of lubricating holes 6c' is formed, and a guide boss 6d corresponding to the guide groove 7b having spival groove 7a is formed at the lower portion of the housing. Furthermore, by a screw 11, a rotor 10 having a magnet 9 is fixed to the said ring collar 7 secured to the lower portion of the shaft 1 by a screw 8, and a stator 12 is also fixed to the lower drum 5, and reference numerals 13 and 13' are rotary transducers, respectively.

Figure 6:
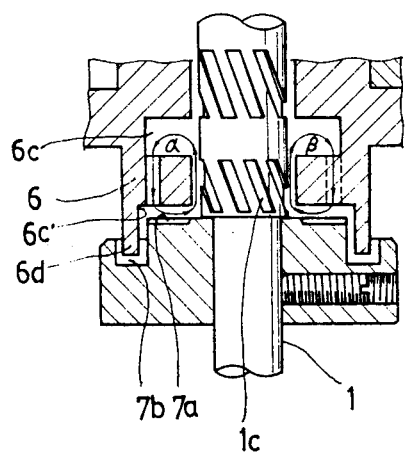
FIG. 6 is an elevated sectional view of a rotary head drum apparatus according to the present invention, showing the flow of the lubricant in the lower portion of the housing.

According to the afore mentioned constitution of the present invention, the shaft 1, flange assembly 4, upper drum 3, ring collar 7, and the rotor 10 (hereinafter, the above parts are referred to as rotating bodies) are all forced upwardly by the suctional power of the magnet 9 positioned in the rotor 10, so that the above rotating bodies are moved downwardly by the downward acting power having a value which is resulted from minusing the suctional power from the weight of the rotating bodies to contact the guide boss 6d of the housing 6 with the guide groove 7b through an appropriate power as shown in FIG. 6, and the suction value by the suctional power is controlled to a desirable value. As the lubricant contained in the lubricant containing groove 6c lubricates between the said guide boss 6d and the guide groove 7b, the friction power from the contacting point can be decreased.

Figure 7:
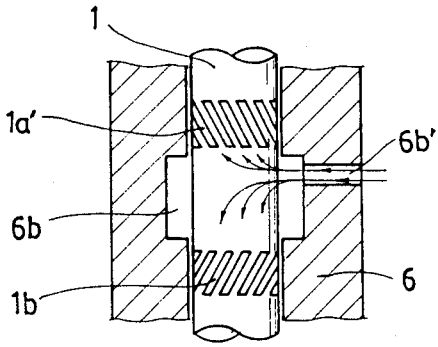
FIG. 7 is an enlarged sectional view of the rotary head drum apparatus, showing the air flow in the middle portion of the housing.
Figure 8:
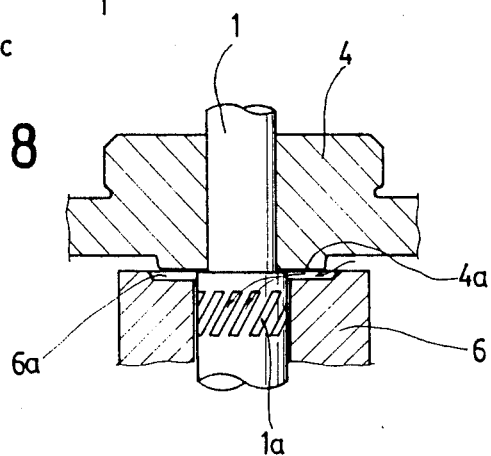
FIG. 8 is an elarged sectional view of the rotary head drum, showing the flow of the lubricant between the flange and the housing.

Thus, when the shaft 1 is rotated by the motor, air flows into the upper and lower lubricating grooves 1a, 1a', 1b and 1b' through the air flowing hole 6b' as shown in FIG. 7.

Figure 4:
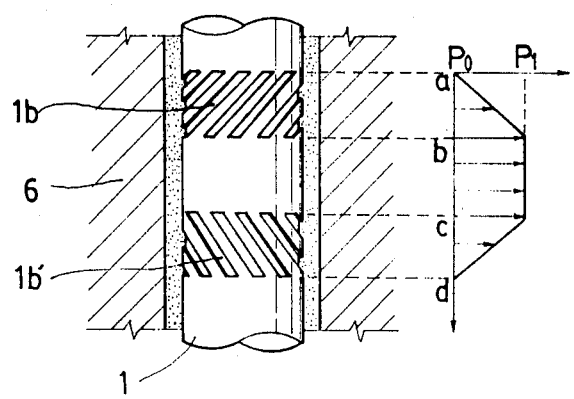
FIG. 4 is an enlarged sectional view for the rotary shaft of the head drum apparatus according to the present invention.

The air inlet through the air flowing hole 6b' is mixed with the lubricant and flows between the shaft 1 and the housing 6, and at the lower lubricating grooves 1b and 1b', the mixed air is flown in the direction described by an arrow as shown in FIG. 4 according to the rotation of the shaft 1.

As the fluid pressure between the lower lubricating grooves 1b and 1b' is so higher than the pressure Po before inlet as much as $P_1$ that the radial load of the shaft 1 can be supported. In FIG. 4, the references a,b,c, and d represent the axial positions of the lubricating grooves 1b and 1b', respectively.

Figure 5:
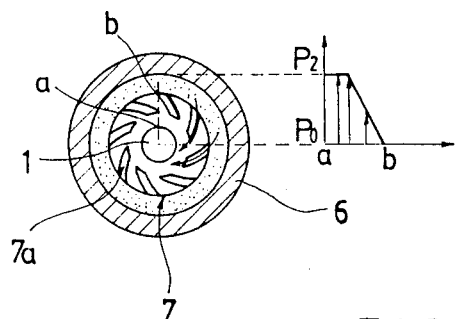
FIG. 5 is an enlarged sectional view for the ring collar of the rotary head drum apparatus according to the present invention.

According to the rotation of the shaft, the lubricant in the lubricant containing groove 6c flows through the fluid paths $\alpha$ and $\beta$ formed by the fluid guide groove 1c as shown in FIGS. 5 and 6.

The lubricant between the housing 6 and the ring collar 7 inlets in the direction of an arrow as shown in FIG. 5 through the spiral groove 7a according to the rotation of the shaft 1, the pressure is higher than the pressure Po before inlet as much as $P_2$, so that the axial load can be supported.

In FIG. 5, a and b represent positions for inner and outer sides in the central direction of the spiral groove 7a.

Furthermore, because the pressure of the lubricant increases from O to $P_2$ when the guide boss 4a of the flange 4 is rotated by the shaft 1, the rotating bodies relatively move downwardly, and at the pressure of $P_2$, the clearance between the guide boss 4a and the guide groove 6a is maintained a few microns, and the guide boss 4a contacts with the guide groove 6a to limit the downwardly movement of the rotating bodies even when the pressure increases over $P_2$, and the lubricant may be flown between the guide boss 4a and the guide groove 6a to decrease the frictional force in contacting.

As mentioned hereinbefore, the rotary head drum apparatus according to the present invention can avoid the vibration and the noise of the bearing in using, and improves the rotating deviation and actuating life, because it uses fluid dynamic pressure bearing instead of the ball bearings, more particulary, according to the invention, it is possible to improve the Jitter and Wow-flutter of the video signal which effect upon the quality of the screen in recording or reproducing the video signal. Furthermore, the constitution of the rotary head drum apparatus according to the present invention is so simple that it is possible to commonly use the parts except the rotary shaft and the housing in the conventional rotary head drum apparatus using ball bearings.

In the constitution of the apparatus according to the present invention, the suctional direction of the motor and the axial load act in counter direction in a different way of the conventional rotary head drum apparatus using ball bearings, so that it is possible to rotate the shaft even when the fluid dynamic pressure is lower than that in prior art, and not need to pay an attention in machining the clearance between the housing and the shaft, and results in increasing the motor efficiency.

Furthermore, in the rotary head drum apparatus according to the present invention, the fluid guide groove is formed in the shaft, therefore, even though there is a dimensional defect or machining tolerence in the housing or ring collar, the forced circulation of the lubricant can be able to generate the fluid dynamic pressure smoothly, at the same time, to guide the forced convection of fluid resulting in minimizing the deviation in the fluid dynamic pressure generated from the ununiformity of the density according to the difference of temperature in iubricant.

Furthermore, because the motor of the apparatus according to the present invention is positioned at the outer side of the drum in a different way of that the motor is inner positioned type in the conventional drum apparatus, there fore, it is easy to assemble or disassemble the apparatus resulting in providing a high productivity and easiness in repairing.

What is claimed is:

1. A rotary head drum device for use in a video cassette recorder, which comprises:
   a base plate,
   a lower drum fixed to said base plate,
   a shaft housing attached to the inner side of said lower drum, said shaft housing including:
      a lubricant containing groove disposed in the lower portion thereof for containing a lubricant disposed therewithin, said lubricant containing groove having a plurality of lubricant flowing holes,
      a lower guide boss disposed at the lower peripheral edge thereof, and
      an air flowing groove disposed in the middle portion thereof, said air flowing groove having a transversely extending air hole,
   a shaft rotatably inserted into said shaft housing, said shaft including:
      a plurality of lubricant guide grooves disposed on the upper and the lower surfaces thereof, respectively, and
      a plurality of fluid guide grooves disposed on the lower surface thereof,
   a flange fixed to the upper portion of said shaft,
   an upper drum fixed to said flange,
   rotary heads adjacent to said upper drum for recording or reproducing video signals in or from a magnetic tape,
   transducers fixed on the upper surface of said lower drum for transducing the video signals,
   a stator and a rotor fixed to the lower portion of said drum and to the lower portion of said shaft, respectively,
   an upper guide grooved disposed in the upper surface of said shaft housing corresponding to an upper guide boss of said flange, and
   a ring collar fixed to the lower end of said shaft, said ring collar provided with a plurality of spiral grooves on the upper surface thereof and a lower guide groove disposed on the upper peripheral surface thereof corresponding to said lower guide boss of said shaft housing, whereby the rotary head drum device can improve the screen and voice quality in recording or reproducing the video signals.

* * * * *